United States Patent
Yamada et al.

(10) Patent No.: US 10,449,108 B2
(45) Date of Patent: Oct. 22, 2019

(54) ROBOT AND METHOD OF SUPPORTING WALKING USING ROBOT

(71) Applicant: Panasonic Intellectual Property Management Co., Ltd., Osaka (JP)

(72) Inventors: Kazunori Yamada, Aichi (JP); Mayu Yokoya, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 201 days.

(21) Appl. No.: 15/623,414

(22) Filed: Jun. 15, 2017

(65) Prior Publication Data

US 2018/0000683 A1 Jan. 4, 2018

(30) Foreign Application Priority Data

Jun. 29, 2016 (JP) .................. 2016-129238

(51) Int. Cl.
| | | |
|---|---|---|
| *A61H 3/04* | (2006.01) | |
| *B25J 5/00* | (2006.01) | |
| *B25J 19/00* | (2006.01) | |
| *B25J 13/08* | (2006.01) | |
| *B25J 11/00* | (2006.01) | |
| *G03B 21/00* | (2006.01) | |

(52) U.S. Cl.
CPC .............. *A61H 3/04* (2013.01); *B25J 5/007* (2013.01); *B25J 11/009* (2013.01); *B25J 13/085* (2013.01); *B25J 19/00* (2013.01); *A61H 2003/043* (2013.01); *A61H 2201/0184* (2013.01); *A61H 2201/0188* (2013.01); *A61H 2201/1659* (2013.01); *A61H 2201/5043* (2013.01); *A61H 2201/5058* (2013.01); *A61H 2201/5061* (2013.01); *G03B 21/00* (2013.01)

(58) Field of Classification Search
CPC ................ A61H 3/04; A61H 2003/043; A61H 2201/5058; A61H 2201/0184; A61H 2201/5061; A61H 2201/5043; A61H 2201/1659; A61H 2201/0188; B25J 5/007; B25J 19/00; B25J 13/085; B25J 11/009; G03B 21/00
USPC .................................................. 700/245, 258
See application file for complete search history.

(56) References Cited

U.S. PATENT DOCUMENTS

| | | | | |
|---|---|---|---|---|
| 6,745,786 B1 * | 6/2004 | Davis | ...................... | A45B 3/00 135/65 |
| 9,131,753 B2 * | 9/2015 | Chien | ...................... | A45B 9/02 |
| 9,468,272 B1 * | 10/2016 | Hyde | ...................... | A61H 3/02 |
| 9,603,761 B2 * | 3/2017 | Fukunaga | ................ | A61H 3/04 |
| 2009/0045021 A1 * | 2/2009 | Einbinder | ................ | A61H 3/04 188/2 D |
| 2012/0173088 A1 * | 7/2012 | Kobashi | ................. | B60B 3/048 701/49 |

(Continued)

FOREIGN PATENT DOCUMENTS

JP        2011-229838        11/2011

*Primary Examiner* — Jaime Figueroa

(74) *Attorney, Agent, or Firm* — Greenblum & Bernstein, P.L.C.

(57) ABSTRACT

A robot includes a rotary element capable of rolling over a walking surface on which a user walks, a handle held by the user, a handle load detector that detects a handle load applied to the handle by the user, and a projector that projects light onto the walking surface, the projector being operable to change the light based on the detected handle load.

10 Claims, 20 Drawing Sheets

(56) References Cited

U.S. PATENT DOCUMENTS

| | | | | |
|---|---|---|---|---|
| 2013/0014790 A1* | 1/2013 | Van Gerpen | ............ | A61H 3/04 135/66 |
| 2013/0106070 A1* | 5/2013 | Woo | ........................ | A61H 3/00 280/29 |
| 2013/0306120 A1* | 11/2013 | Fukunaga | ................ | A61H 3/04 135/66 |
| 2015/0060175 A1* | 3/2015 | Katayama | .............. | B62D 51/04 180/197 |
| 2015/0183482 A1* | 7/2015 | Kubo | ....................... | A61H 3/04 180/209 |
| 2016/0095397 A1* | 4/2016 | Crowhurst | ............... | A45B 9/00 135/66 |
| 2016/0253890 A1* | 9/2016 | Rabinowitz | ............. | A61H 1/02 340/539.13 |
| 2016/0299502 A1* | 10/2016 | Chamberlain | ........ | G05D 1/0242 |
| 2016/0309861 A1* | 10/2016 | Chou | ....................... | A45B 3/04 |
| 2018/0084877 A1* | 3/2018 | Sarauer | ................... | A45B 3/02 |

\* cited by examiner

FIG. 6

| MOVING DIRECTION | USER'S LOAD TENDENCY DATA ||
|---|---|---|
| | AVERAGE LOAD VALUE IN MOVING DIRECTION IN WALKING | AVERAGE LOAD VALUE IN WALKING IN DIRECTION IN WHICH CENTER OF GRAVITY IS DEVIATED |
| MOVE STRAIGHT FORWARD | Fy: 10 N | Mz: 1.0 Nm |
| MOVE STRAIGHT BACKWARD | Fy: -10 N | Mz: -1.0 Nm |
| TURN TO RIGHT | Fy: 4 N | Mz: 5 Nm |
| ... | ... | ... |

FIG. 15
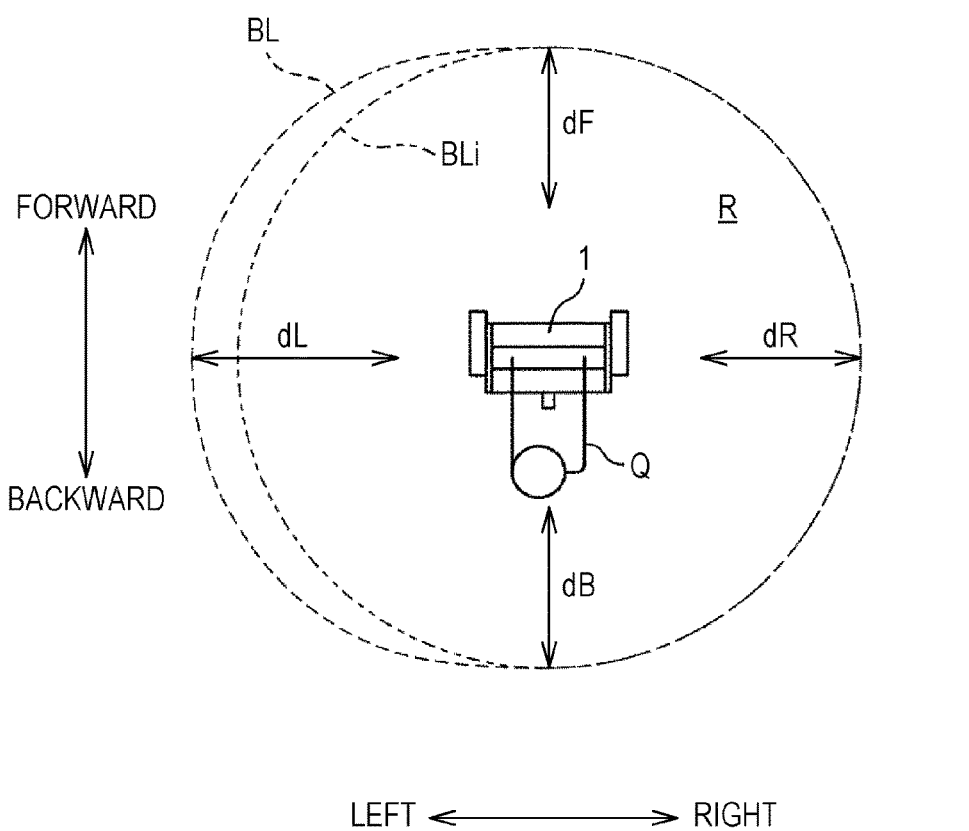
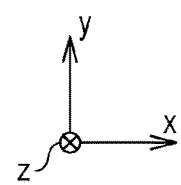

FIG. 16
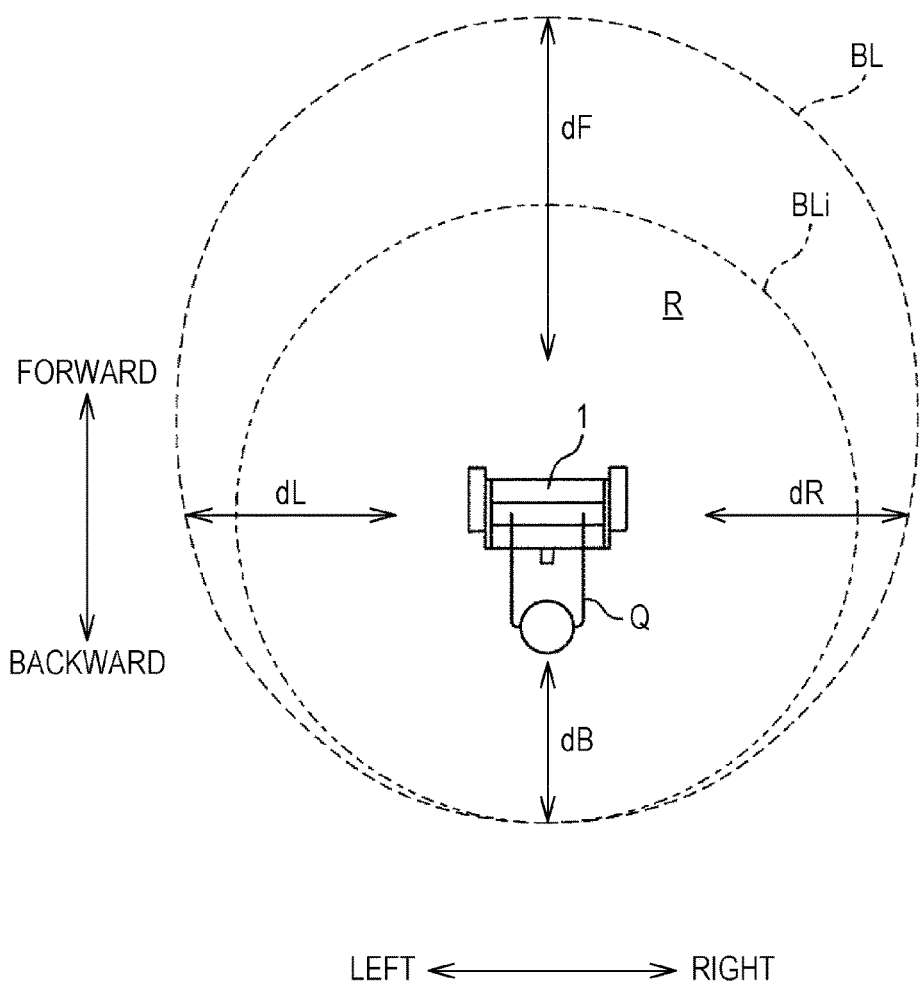
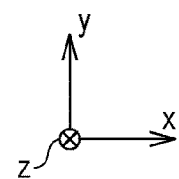

FIG. 17
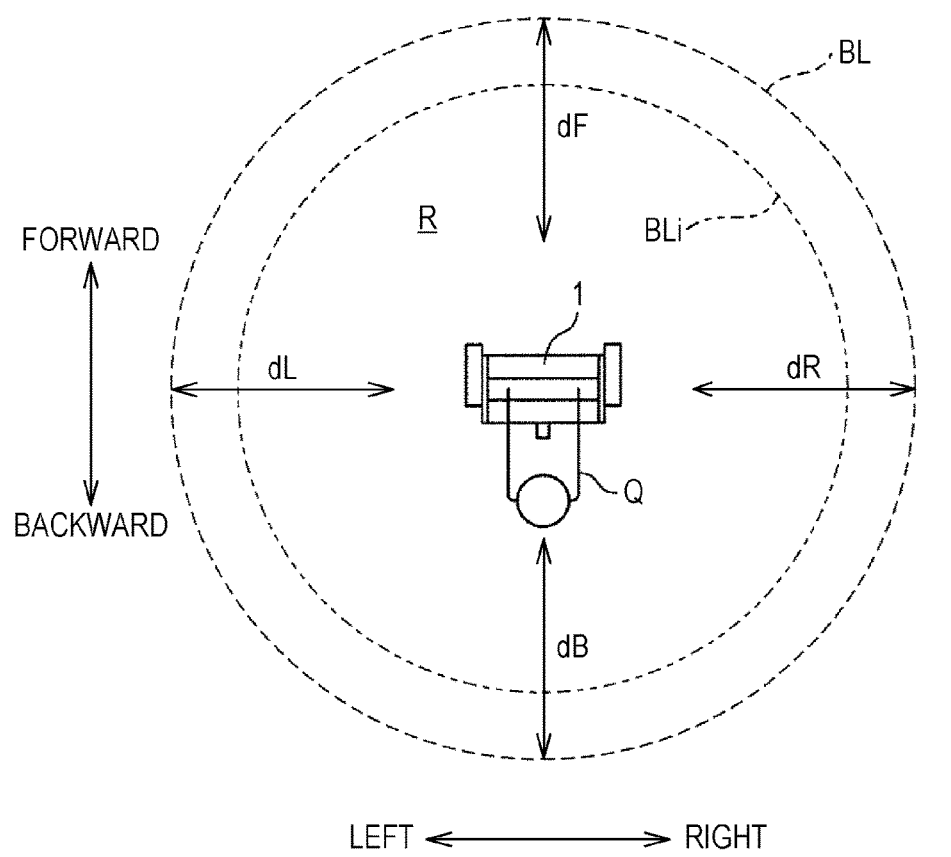
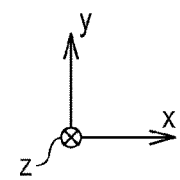

FIG. 19
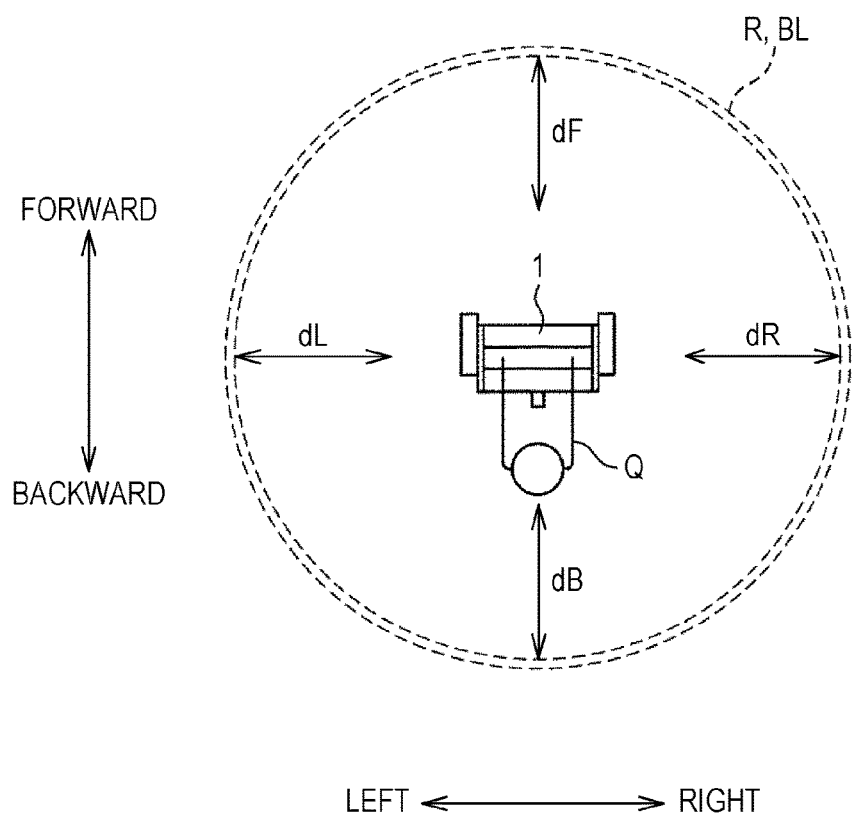
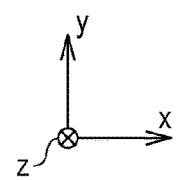

ROBOT AND METHOD OF SUPPORTING WALKING USING ROBOT

BACKGROUND

1. Technical Field

The present disclosure relates to a walking support robot that supports a user to walk, and a method of supporting walking.

2. Description of the Related Art

In recent years, it has been known to use a walking support robot to support a user to walk. Japanese Unexamined Patent Application Publication 2011-229838 discloses a walking support robot that supports a user to walk using a stick such that the robot points to a location to which the user is to take a step. More specifically, the robot projects an image of a footprint-like shape onto a walking surface such that the image indicates a location at which a foot is to be put.

SUMMARY

There may occur a situation in which a user of a walking support robot concentrates his/her attention on walking so much that the use pays no attention to surrounding conditions. In the case of the walking support robot disclosed in Japanese Unexamined Patent Application Publication 2011-229838, a user walks while watching the image of the footprint-like shape projected onto the walking surface by the projector, and thus the user tends not to pay sufficient attention to surrounding conditions.

In such a situation, if a nearby third person is not aware of the walking support robot or the user thereof, there is a possibility that the third person comes into contact with the robot or the user. For example, in a case where a third person is walking while watching down to a portable terminal to use it, there is a possibility that the third person is not aware of the walking support robot in front of the third person.

One non-limiting and exemplary embodiment provides a technique of, in a situation in which a user is walking while being supported by a walking support robot, reducing a probability that a third person at a close location comes into contact with the walking support robot or the user.

In one general aspect, the techniques disclosed here feature a robot including a rotary element capable of rolling over a walking surface on which a user walks, a handle held by the user, a handle load detector that detects a handle load applied to the handle by the user, and a projector that projects light onto the walking surface, the projector being operable to change the light based on the detected handle load.

According to the technique of the present disclosure, in a situation in which a user is walking while being supported by the walking support robot, it is possible to reduce the probability that a nearby third person comes into contact with the walking support robot or the user.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a diagram illustrating a load tendency map according to an embodiment of the present disclosure;

FIG. 15 is a diagram illustrating another example of a change in a boundary line of a safety ensuring area around a walking support robot;

FIG. 16 is a diagram illustrating another example of a change in a boundary line of a safety ensuring area around a walking support robot;

FIG. 17 is a diagram illustrating a different example of a change in a boundary line of a safety ensuring area around a walking support robot;

FIG. 19 is a diagram illustrating another example of a boundary line of a safety ensuring area around a walking support robot.

DETAILED DESCRIPTION

Figure 1:
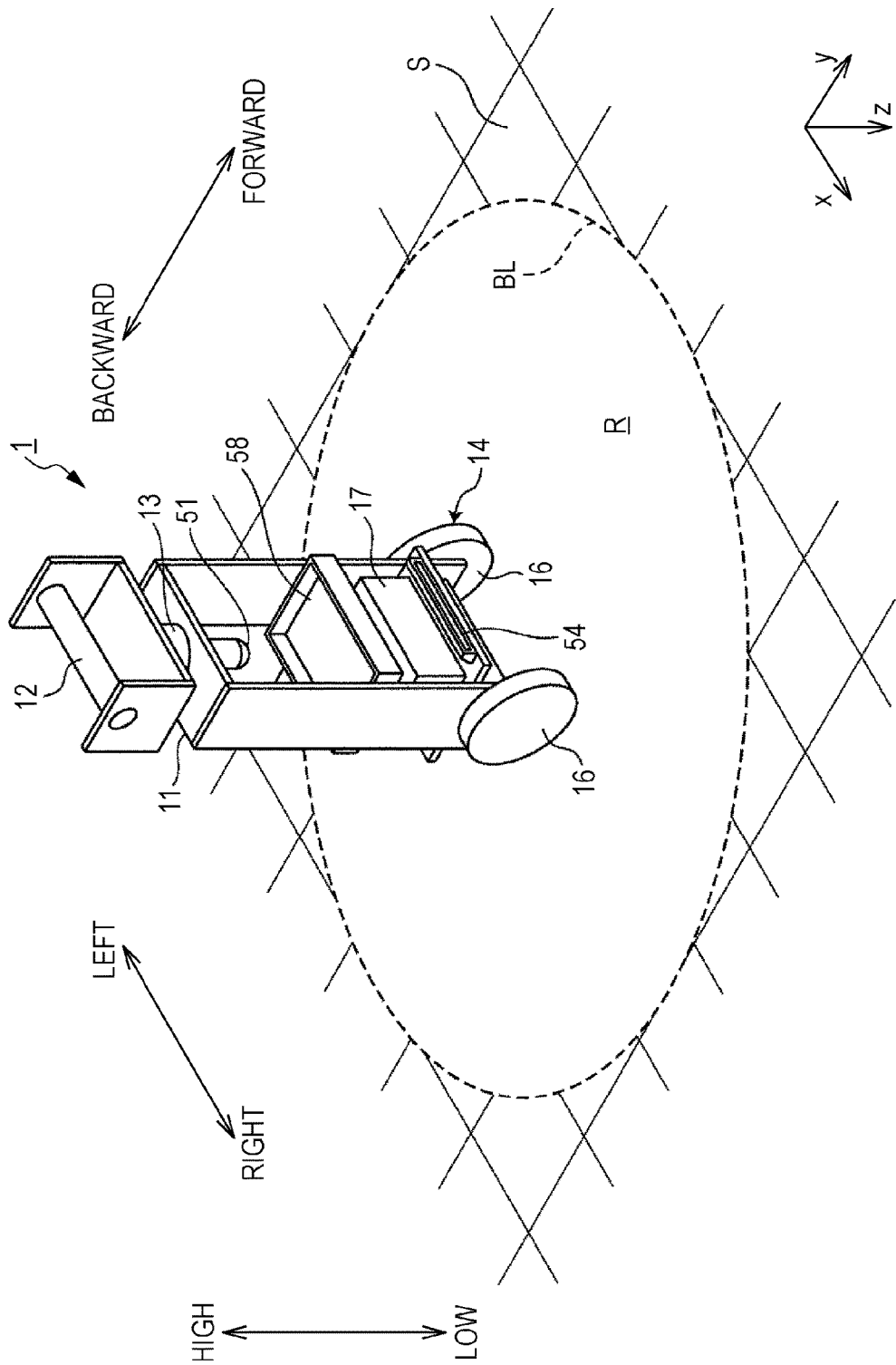
FIG. 1 is a diagram illustrating an external appearance of a walking support robot according to an embodiment of the present disclosure.

In an aspect, the present disclosure provides a robot including a rotary element capable of rolling over a walking surface on which a user walks, a handle held by the user, a handle load detector that detects a handle load applied to the handle by the user, and a projector that projects light onto the walking surface, the projector being operable to change the light based on the detected handle load.

According to this aspect, in a situation in which a user is walking while being supported by the walking support robot, it is possible to reduce the probability that a nearby third person comes into contact with the walking support robot or the user.

For example, the projector may project a boundary line onto the walking surface such that the robot is enclosed at least partially by the boundary line, and the projector may change a distance between the boundary line and the robot based on the detected handle load.

For example, the projector may increase the distance between the boundary line and the robot as the detected handle load increases.

For example, the handle load detector may detect a handle load in a horizontal direction, and the projector may change a shape of the boundary line such that a first distance between a first part of the boundary line and the robot is greater than a second distance between a second part of the boundary line and the robot as the detected handle load in the horizontal direction increases, the first part of the boundary line being a part of the boundary line located in a direction of the detected handle load, the second part of the boundary line being a part of the boundary line different from the first part.

For example, the projector may change the distance between the boundary line and the robot based on a tendency of the detected handle load.

For example, in a case where the tendency of the handle load detected by the handle load detector indicates a continuous presence of a load in a particular direction different from the moving direction, the projector may project the boundary line such that the distance between the boundary line and the robot in the particular direction is maintained to be greater than in the other directions.

For example, the robot may further include a luggage space where a luggage is allowed to be put, and a luggage weight detector that detects a weight of the luggage, wherein the projector may increase the distance between the boundary line and the robot as the detected weight of the luggage increases.

For example, the robot may further include a moving speed detector that detects a moving speed of the robot, wherein the projector may increase the distance between the boundary line and the robot as the detected moving speed increases.

For example, the robot may further include an obstacle detector that detects whether an obstacle exists in an area between the boundary line and the robot, and a notifier that, in a case where the obstacle detector detects the obstacle, notifies the user of the existence of the obstacle.

For example, in a case where the obstacle detector detects the obstacle, the projector may project a warning image onto the walking surface to provide a warning against the obstacle.

In an aspect, the present disclosure provides a method of supporting a user to walk using a robot, the method including detecting a handle load applied to a handle of the robot by the user, projecting light, by a projector disposed on the robot, onto a walking surface on which the user walks, and changing the light based on the detected load applied to the handle.

According to the aspect, in a situation in which a user is walking while receiving a support by the walking support robot, it is possible to reduce the probability that a nearby third person comes into contact with the walking support robot or the user.

Embodiments of the present disclosure are described below with reference to accompanying drawings. Note that, to provide an easier understanding, each figure may include an exaggerated illustration about some element.

Figure 2:
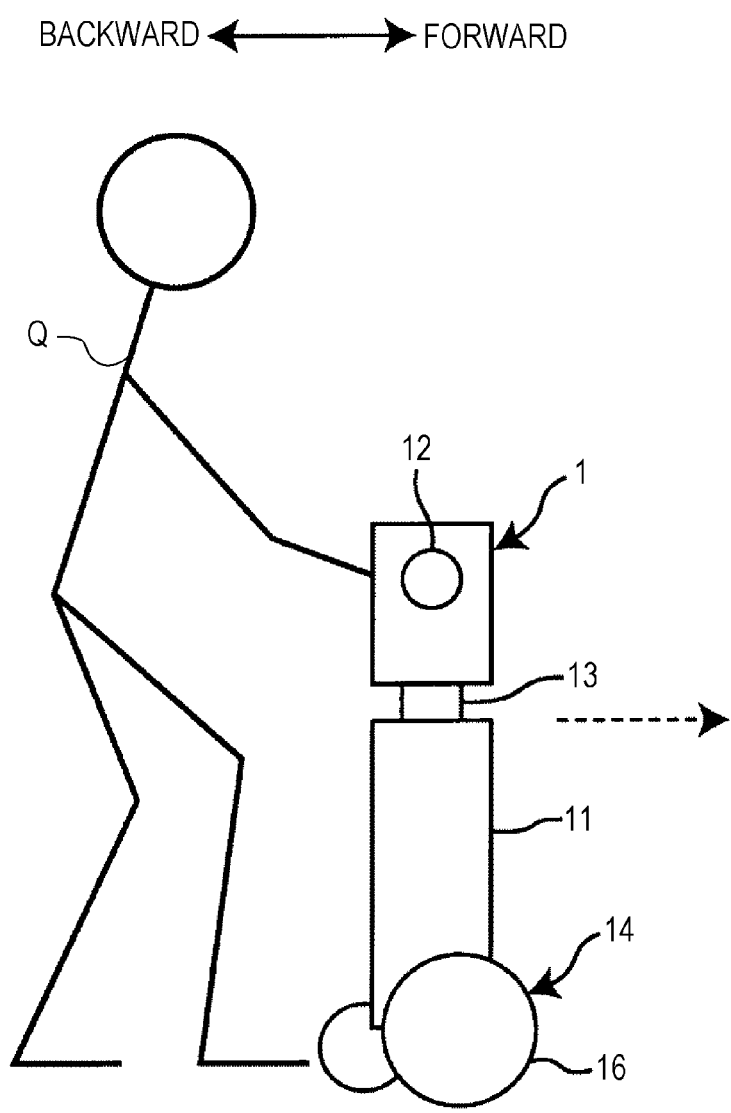
FIG. 2 is a diagram illustrating a manner in which a user walks while being supported by a walking support robot according to an embodiment of the present disclosure.
Figure 3:
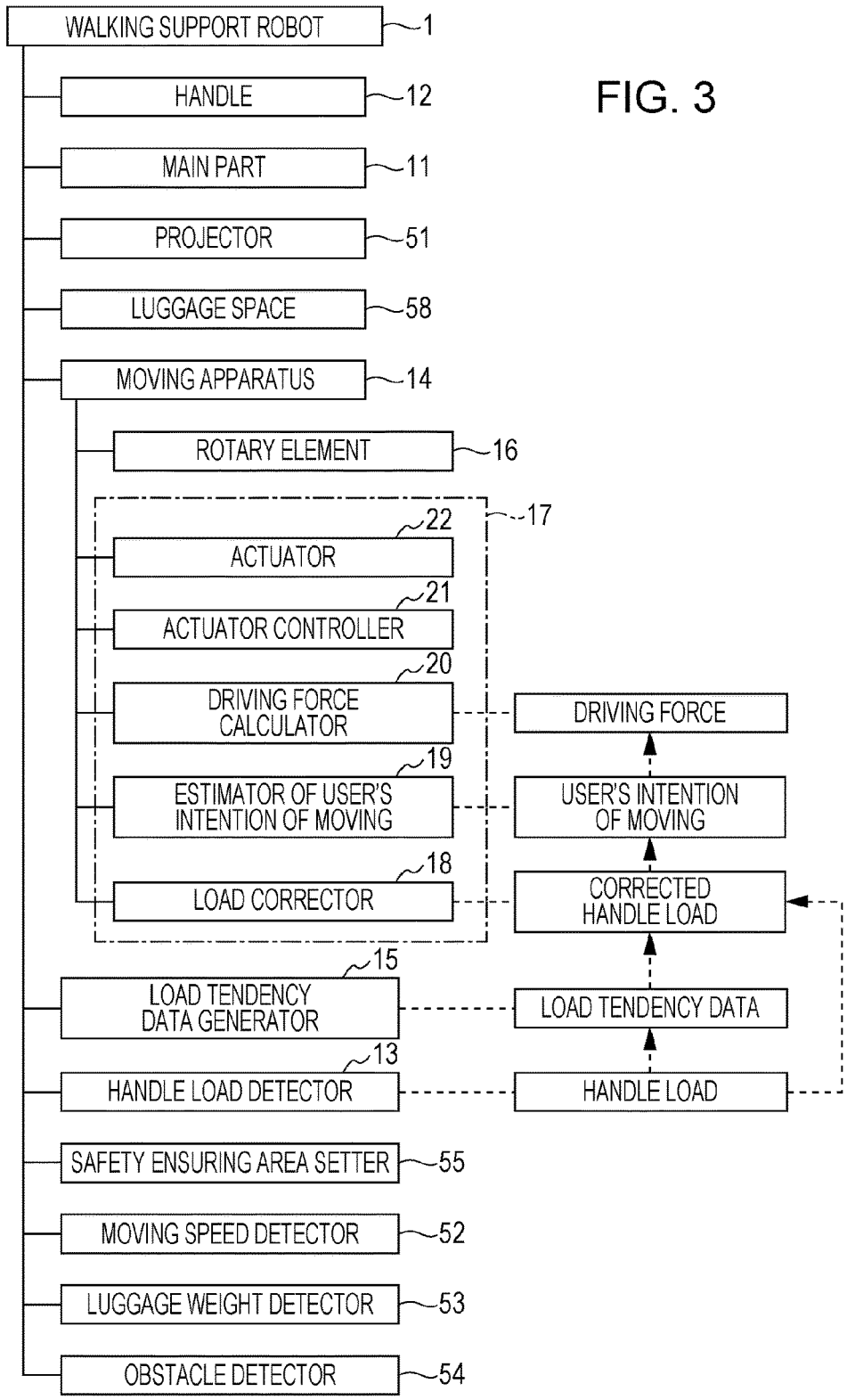
FIG. 3 is a block diagram illustrating a configuration of a walking support robot according to an embodiment of the present disclosure.

FIG. 1 is a diagram schematically illustrating an external appearance of a walking support robot 1 (hereinafter also referred to simply as the robot 1) according to an embodiment. FIG. 2 is a diagram illustrating a manner in which a user walks while being supported by the robot 1 FIG. 3 is a block diagram illustrating a general configuration of the robot 1.

In the present embodiment, the robot 1 supports a user Q in walking on a walking surface such as a floor, a ground, a paved road, or the like. To provide the support, as shown in FIG. 1 to FIG. 3, the robot 1 includes a main part 11, a handle 12 that the user is allowed to hold, a handle load detector 13 that detects a load applied to the handle 12, a moving apparatus 14 that moves the main part 11, and a load tendency data generator 15.

The handle 12 is disposed above the main part 11 such that the handle 12 is shaped and located at a height so as to allow the walking user Q to easily hold the handle 12 with user's two hands.

The handle load detector 13 detects a load (a handle load) applied to the handle 12 by the user Q holding the handle 12. More specifically, when the user Q walks while holding the handle 12, the handle 12 receives a handle load applied by the user Q, and the handle load detector 13 detects the direction and the magnitude of the handle load applied to the handle 12 by the user Q.

Figure 4:
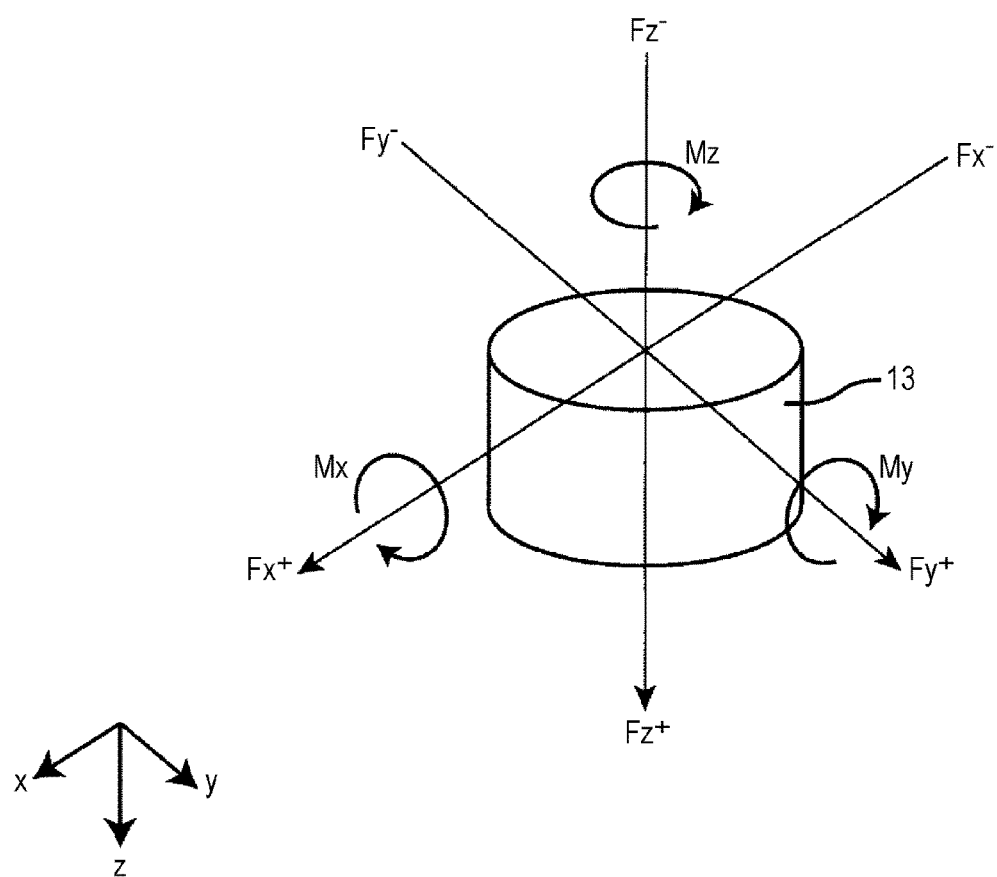
FIG. 4 is a diagram illustrating directions in which a handle load is detected by a handle load detector according to an embodiment of the present disclosure.

FIG. 4 shows a detection direction of the handle load detected by the handle load detector 13. For example, the handle load detector 13 may be, as shown in FIG. 4, a six-axis force sensor capable of detecting forces applied in respective three axis directions perpendicular to each other and moments about the respective three axes. The three axes perpendicular to each other are an x-axis extending in a right and left direction of the robot 1, a y-axis extending in a front-back direction of the robot 1, and a z-axis extending in a height direction of the robot 1. The forces applied in the three axis directions are a force Fx applied in the x-axis direction, a force Fy applied in the y-axis direction, and a force Fz applied in the x-axis direction. In a first embodiment, a force of Fx applied to the right is denoted as Fx+, and a force applied to the left is denoted as Fx−. As for Fy, a force applied in a forward direction is denoted as Fy+, while a force applied in a backward direction is denoted as Fy−. As for Fz, a force applied in a downward vertical direction is denoted as Fz+ while a force applied in an upward vertical direction is denoted as Fz−. The moments around the three axes are a moment Mx about the x-axis, a moment My about the y-axis, and a moment Mz about the z-axis.

The moving apparatus 14 moves the main part 11 based on the magnitude and the direction of the handle load (the force and the moment) detected by the handle load detector 13. In the present embodiment, the moving apparatus 14 performs control as described below. Note that in the present description, forces Fx, Fy, Fz, Mx, My, and Mz will also be denoted as loads.

In a case where a force of Fy+ is detected by the handle load detector 13, the moving apparatus 14 moves the main part 11 in the forward direction. That is, when a force of Fy+ is detected by the handle load detector 13, the robot 1 performs a move-forward operation. When the robot 1 is in the move-forward operation, if an increase occurs in the force of Fy+ detected by the handle load detector 13, the moving apparatus 14 increases the moving speed in the forward direction of the robot 1. On the other hand, when the robot 1 is in the move-forward operation, if a reduction occurs in the force of Fy+ detected by the handle load detector 13, the moving apparatus 14 reduces the moving speed in the forward direction of the robot 1.

In a case where a force of Fy− is detected by the handle load detector 13, the moving apparatus 14 moves the main part 11 in the backward direction. That is, when a force of Fy− is detected by the handle load detector 13, the robot 1 performs a move-backward operation. When the robot 1 is in the move-backward operation, if an increase occurs in the force of Fy− detected by the handle load detector 13, the moving apparatus 14 increases the moving speed in the backward direction of the robot 1. On the other hand, when the robot 1 is in the move-backward operation, if a reduction occurs in the force of Fy− detected by the handle load detector 13, the moving apparatus 14 reduces the moving speed in the backward direction of the robot 1.

In a case where a force of Fy+ and a moment of Mz+ are detected by the handle load detector 13, the moving apparatus 14 moves the main part 11 so as to turn to the right. That is, when a force of Fy+ and a moment of Mz+ are detected by the handle load detector 13, the robot 1 performs a turn-to-right operation. When the robot 1 is in the turn-to-right operation, if an increase occurs in the moment of Mz+ detected by the handle load detector 13, the turning radius of the robot 1 is reduced. On the other hand, when the robot 1 is in the turn-to-right operation, if an increase occurs in the force of Fy+ detected by the handle load detector 13, the turning speed is increased.

In a case where a force of Fy+ and a moment of Mz− are detected by the handle load detector 13, the moving apparatus 14 moves the main part 11 so as to turn to left. That is, when a force of Fy+ and a moment of Mz− are detected by the handle load detector 13, the robot 1 performs a turn-to-left operation. When the robot 1 is in the turn-to-left operation, if an increase occurs in the moment of Mz− detected by the handle load detector 13, the turning radius of the robot 1 is reduced. On the other hand, when the robot 1 is in the turn-to-left operation, if an increase occurs in the force of Fy+ detected by the handle load detector 13, the turning speed is increased.

Note that the control of the moving apparatus 14 is not limited to the example described above. The moving apparatus 14 may control the move-forward operation and the move-backward operation of the robot 1, for example, based on the force of Fy and the force of Fz. The moving apparatus 14 may control the turning operation of the robot 1, for example, based on the moment of Mx or My.

In the description described above, it is assumed by way of example that the handle load detector 13 according to the present embodiment is the six-axis force sensor. However, the handle load detector 13 is not limited to the six-axis force sensor. For example, the handle load detector 13 may be a three-axis sensor, a strain sensor, or the like.

The moving apparatus 14 includes wheels 16 that are rotary elements provided below the main part 11, and a driving unit 17 that drives the wheels 16.

As shown in FIG. 1, the wheels 16 are capable of rolling over a walking surface S and supporting the main part 11 in an independent state. When the wheels 16 are driven to rotate by the driving unit 17, the main part 11 moves, for example, in a direction (forward or backward direction) denoted by an arrow in FIG. 2 while keeping the independent posture. In the present embodiment, the moving apparatus 14 includes a moving mechanism using, by way of example, two wheels 16. Alternatively, the moving mechanism may use other types of rotary elements (such as a moving belt, a roller, or the like).

The driving unit 17 includes a load corrector 18, an estimator 19 that estimates user's intention of moving, a driving force calculator 20, an actuator controller 21, and an actuator 22.

The load corrector 18 corrects the handle load detected by the handle load detector 13 depending on a load tendency of the user Q. More specifically, the load corrector 18 corrects the value of the handle load detected by the handle load detector 13 based on load tendency data generated by the load tendency data generator 15. Details of the correction of the handle load will be described later. Alternatively, the load corrector 18 may correct the value of the handle load based on a usage location or a usage time of the robot 1, a physical condition of the user Q, or the like.

The estimator 19 that estimates user's intention of moving estimates an intention of moving of the user Q based on the handle load corrected by the load corrector 18 (hereinafter referred to as the corrected handle load). Note that the user's intention of moving refers to the moving direction and the moving speed intended by the user, that is, the walking direction and the walking speed of the user. In the present embodiment, the estimator 19 that estimates user's intention of moving estimates the intention of moving of the user Q from the value of the corrected handle load in each moving direction. For example, in a case where the force Fy+ detected by the handle load detector 13 is greater than or equal to a predetermined first threshold value, and the force My+ is smaller than a predetermined second threshold value, the estimator 19 that estimates user's intention of moving determines that a move-straight operation is the intention of moving of the user Q. Furthermore, for example, the estimator 19 that estimates user's intention of moving estimates a moving speed based on the value of the corrected handle load in the Fz direction. Furthermore, for example, in a case where the force Fy+ detected by the handle load detector 13 is greater than or equal to a predetermined third threshold value, and the force My+ is greater than or equal to a predetermined second threshold value, the estimator 19 that estimates user's intention of moving determines that a turn-to-right operation is the intention of moving of the user Q. Note that the estimator 19 that estimates user's intention of moving may estimate a turning speed based on the value of the corrected handle load in the Fz direction, and estimate a turning radius based on the value of the corrected handle load in the My direction.

The driving force calculator 20 calculates a driving force based on information on the handle load corrected by the load corrector 18. More specifically, the driving force calculator 20 calculates the driving force based on the intention of moving of the user Q estimated from the information on the corrected handle load, that is, based on the moving direction and the moving speed of the user Q. For example, in a case where the intention of moving of the user Q is the move-forward operation or the move-backward operation, the driving force is determined such that an amount of rotation is equal for the two wheels 16. In a case where the intention of moving of the user Q is the turn-to-left operation, the driving force is determined such that the amount of rotation of the right-side wheel 16 of the two wheels 16 is greater than the amount of rotation of the left-side wheel 16. Furthermore, the driving force is determined depending on the moving speed of the user Q.

The actuator controller 21 controls the driving of the actuator 22 based on the information on the driving force determined by the driving force calculator 20. The actuator controller 21 may acquire the information on the amount of rotation of the wheels 16 from the actuator 22, and may transmit the information on the amount of rotation of the wheels 16 to the driving force calculator 20 and the user's load tendency extractor 23.

The actuator 22 may be, for example, a motor or the like that drives the wheels 16 to rotate. The actuator 22 is connected to the wheels 16 via a gear mechanism, a pulley mechanism, or the like. The actuator 22 drives the wheels 16 to roll under the control of the actuator controller 21.

The load tendency data generator 15 generates load tendency data of the user Q based on the information on the handle load detected in the past. The load tendency data refers to data indicating a tendency of the handle load applied by the user Q in a particular operation. The particular operation may be, for example, a move-straight operation, a move-backward operation, a turning operation, or the like. For example, in a case where the user Q is bent at his/her waist, when the user Q holds the handle 12, the user Q may lean against the robot 1, which results in a tendency that the handle load in the downward vertical direction is large, that is, the force of the Fz+ is large. In a case where the user Q walks while swaying his/her body from side to side, when the user Q holds the handle 12, the handle load tends to be large in the leftward and rightward direction, that is, the moment My tends to be large although the move-forward operation is performed. As described above, the load tendency data generator 15 generates a load tendency of the user Q for each operation from the past load data.

In the walking support robot 1 configured in the above-described manner, a control configuration for supporting the user Q to walk is described below.

As illustrated in FIG. 3, the handle load detector 13 detects the handle load applied to the handle 12. The information on the handle load detected by the handle load detector 13 is transmitted to the load corrector 18. Based on the load tendency data generated by the load tendency data generator 15, the load corrector 18 corrects the value of the handle load detected by the handle load detector 13. The information on the corrected handle load is transmitted to the estimator 19 that estimates user's intention of moving. Based on the information on the corrected handle load, the estimator 19 that estimates user's intention of moving estimates the intention of moving of the user Q (the moving direction and the moving speed). The information on the estimated intention of moving of the user is transmitted to the driving force calculator 20. Based on the information on the estimated intention of moving of the user Q, the driving force calculator 20 determines the driving force. The information on the determined driving force is transmitted to the actuator controller 21. The actuator controller 21 controls driving of the actuator 22 based on the information on the driving force determined by the driving force calculator 20.

Under the control of the actuator controller 21, the actuator 22 drives the wheels 16 to rotate thereby moving the main part 11.

Furthermore, as shown in FIG. 3, the information on the handle load detected by the handle load detector 13 is also transmitted to the load tendency data generator 15. The information on the handle load detected by the handle load detector 13 is also used in generating and updating the load tendency data.

Figure 5:
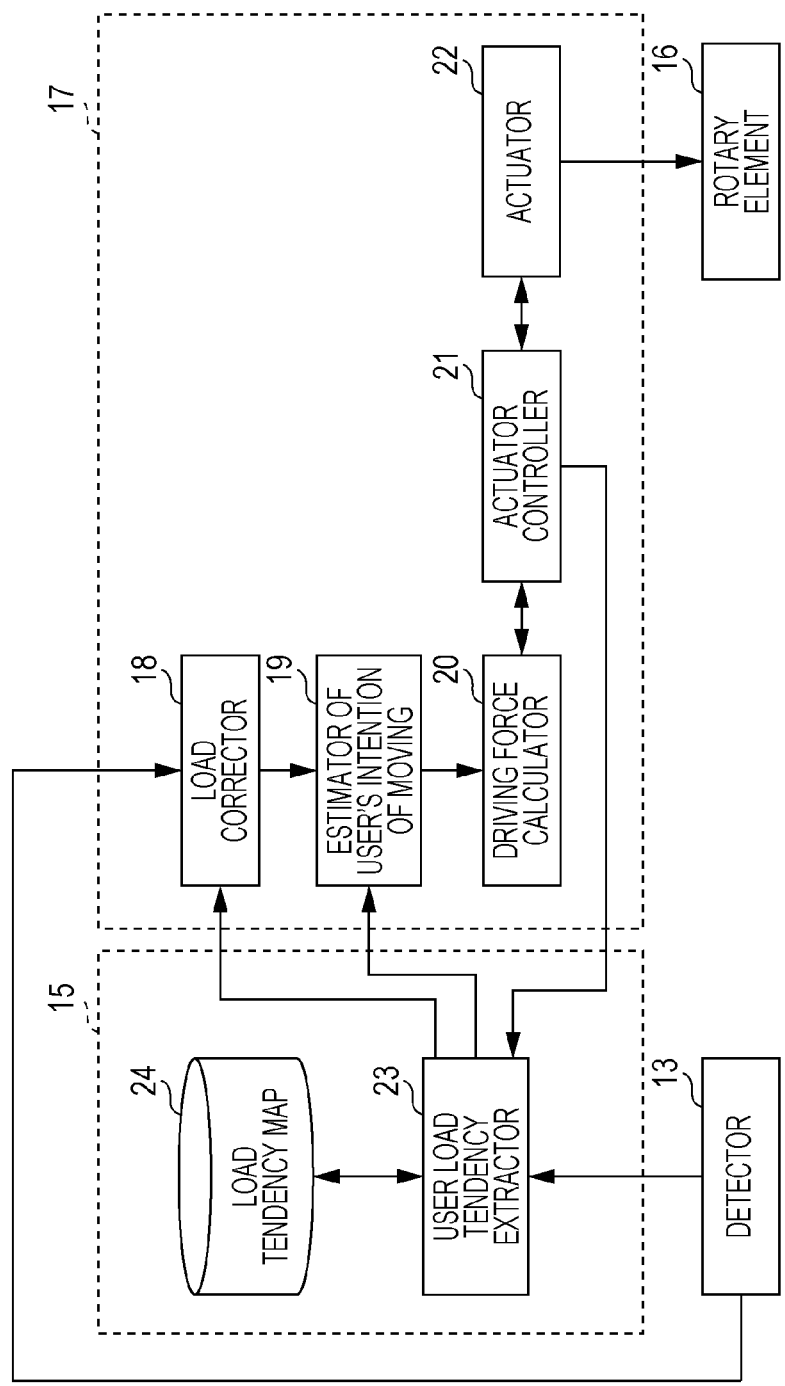
FIG. 5 is a control block diagram illustrating a control configuration of a walking support by a walking support robot according to an embodiment of the present disclosure.

The control of the support of walking by the robot 1 is described in detail below with reference to FIG. 5. FIG. 5 is a control block diagram illustrating, in detail, the control configuration of the support of walking by the walking support robot 1.

As illustrated in FIG. 5, the load tendency data generator 15 includes the user's load tendency extractor 23 that extracts the load tendency of the user Q in the moving direction of the user Q, and a load tendency map 24 storing the load tendency data of the user Q.

The user's load tendency extractor 23 extracts the load tendency of the user Q in the moving direction of the user Q. More specifically, the user's load tendency extractor 23 extracts the load tendency data of the user Q in the moving direction of the user Q from the load tendency map 24. For example, in a case where the user Q performs the move-straight operation (moving straight in the forward direction), the user's load tendency extractor 23 extracts the load tendency of the user Q in the move-straight operation from the load tendency map 24. The user's load tendency extractor 23 transmits the load tendency data extracted from the load tendency map 24 to the load corrector 18.

The user's load tendency extractor 23 generates load tendency data of the user Q based on the information on the handle load detected by the handle load detector 13 and the information on the amount of rotation of the wheels 16 acquired by the actuator controller 21. The generated load tendency data is transmitted to the load tendency map 24. As a result, the load tendency data in the load tendency map 24 is updated.

The load tendency map 24 is a database storing the load tendency data of the user Q in each moving direction of the user Q. The load tendency map 24 stores the load tendency data of the user Q in each moving direction.

FIG. 6 illustrates an example of the load tendency map 24. As illustrating in FIG. 6, the load tendency map 24 stores, as the load tendency data, the average load value in the moving direction in walking and the average load value in the direction in which the center of gravity is deviated in walking, for each moving direction of the user Q. For example, referring to FIG. 6, when the user Q moves straight in the forward direction (along the y-axis) together with the robot 1, the handle 12 is pushed by the user Q with a load (force) of an average of 10 N. Furthermore, a load (force) is also applied in a particular direction other than the forward direction, and more specifically, a moment Mz of 1.0 Nm is continuously applied to the handle 12. This means that when the user Q moves straight in the forward direction, the center of gravity is always deviated to the left. That is, the user Q has a walking tendency that when the user Q moves straight in the forward direction together with the robot 1, the user Q keeps his/her posture tilted to the left from the robot 1.

Figure 7:
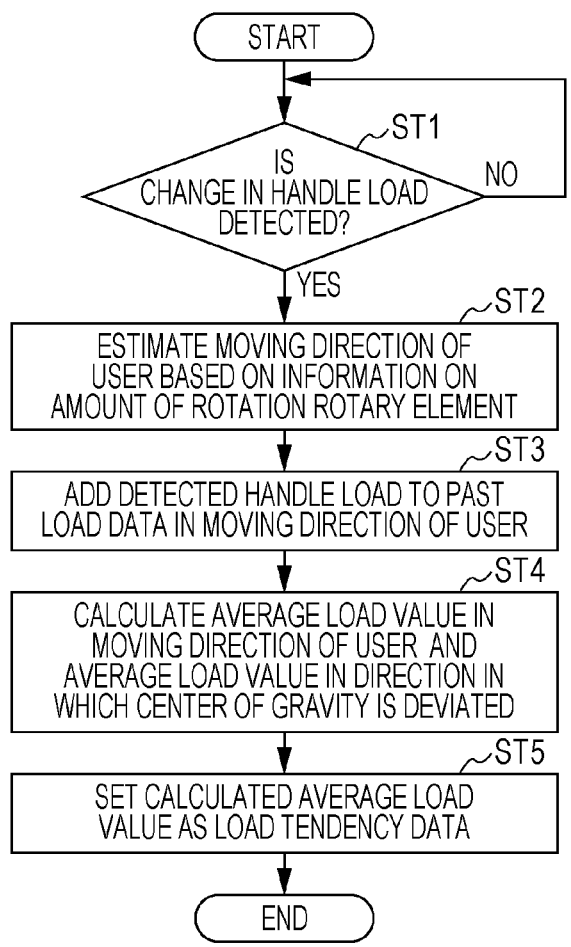
FIG. 7 is a flow chart illustrating an example of a process of generating load tendency data of a walking support robot according to an embodiment of the present disclosure.

The generation of such load tendency data is described below with reference to FIG. 7. FIG. 7 is a flow chart illustrating an example of a process of generating load tendency data of the robot 1.

As shown in FIG. 7, step ST1 is performed to detect a change in the handle load detected by the handle load detector 13. More specifically, in step ST1, based on the handle load, a determination is performed as to whether a change occurs in the moving direction of the user Q. In a case where a change in the handle load is detected, the processing flow proceeds to step ST2. In a case where no change in the handle load is detected, step ST1 is repeated.

In step ST2, the user's load tendency extractor 23 estimates a current moving direction of the user Q based on the information on the amounts of rotation of the wheels 16. More specifically, when a change in the handle load is detected in step ST1, the actuator controller 21 acquires the information on the amounts of rotation of the wheels 16. The information on the amounts of rotation acquired by the actuator controller 21 is transmitted to the user's load tendency extractor 23. For example, based on the amount of rotation of each of the two wheels 16 respectively located on the right and left sides, the user's load tendency extractor 23 estimates the moving direction of the user Q.

In step ST3, the user's load tendency extractor 23 adds the handle load detected in step ST1 to past load data in the estimated moving direction of the user Q. More specifically, the user's load tendency extractor 23 reads out past load data stored in the load tendency map 24 and adds the handle load detected in step ST1 to the read past load data. Note that the past load data includes all pieces of load data that have been detected in the past.

In step ST4, the user's load tendency extractor 23 calculates an average load value in the moving direction of the user Q in walking and an average load value in the deviation direction.

In step ST5, the user's load tendency extractor 23 sets the load tendency data such that the calculated average load value in the moving direction of the user Q in walking and the average load value in the deviation direction are employed as the load tendency data. More specifically, the user's load tendency extractor 23 transmits the information on the calculated average load value to the load tendency map 24 and updates the load tendency map 24 in terms of the average load value in the moving direction of the user Q in walking and the average load value in the deviation direction.

Figure 8:
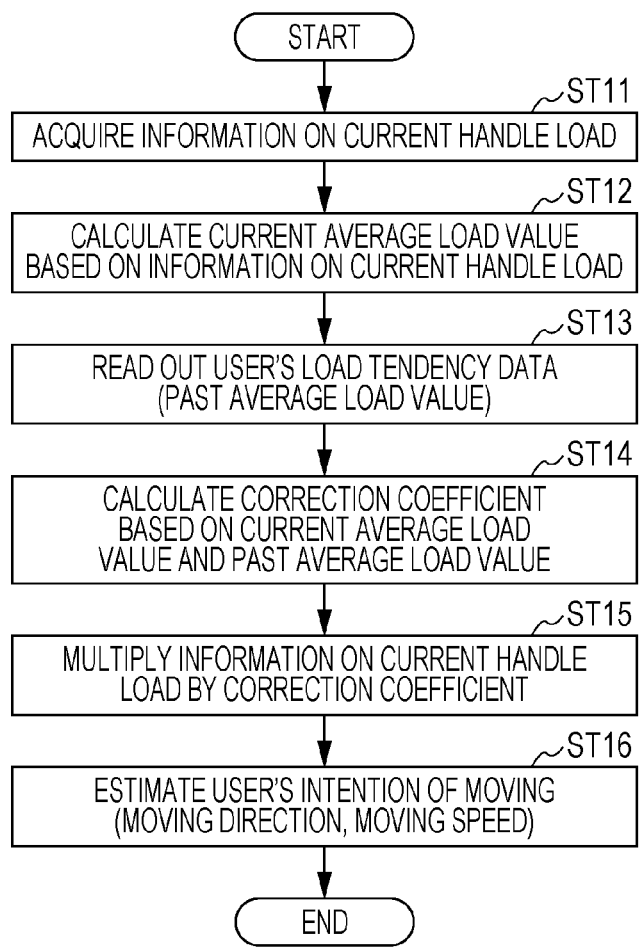
FIG. 8 is a flow chart illustrating an example of a process of estimating an intention of moving performed by a walking support robot according to an embodiment of the present disclosure.

Next, the process of estimating the intention of moving of the user Q is described with reference to FIG. 8. FIG. 8 is a flow chart illustrating an example of the process of estimating the intention of moving of the user Q.

As illustrated in FIG. 8, in step ST11, the load corrector 18 acquires the information on the current handle load detected by the handle load detector 13.

In step ST12, the load corrector 18 calculates a current moving average load value based on the information on the current and previous handle loads.

In step ST13, the user's load tendency extractor 23 reads out load tendency data of the user Q. More specifically, the user's load tendency extractor 23 reads out the past average load value from the load tendency map 24 and transmits the past average load value to the load corrector 18.

In step ST14, the load corrector 18 calculates a correction coefficient based on the current moving average load value and the past moving average load value. More specifically, for example, the load corrector 18 calculates the correction coefficient by dividing the past moving average load value by the current moving average load value.

In step ST15, the load corrector 18 multiplies the current handle load value by the correction coefficient. That is, the load corrector 18 multiplies the current handle load value acquired in step ST11 by the correction coefficient calculated in step ST14. According to the calculated correction coefficient, the load corrector 18 corrects the value of the handle load.

In step ST16, the estimator 19 that estimates user's intention of moving estimates the intention of moving of the user Q based on the information on the corrected handle load.

The correction of the handle load is described in further detail below with reference to a specific example. In this example, it is assumed that the handle load is corrected for a user walks in a state in which the center of gravity is deviated in the right direction.

Figure 9A:
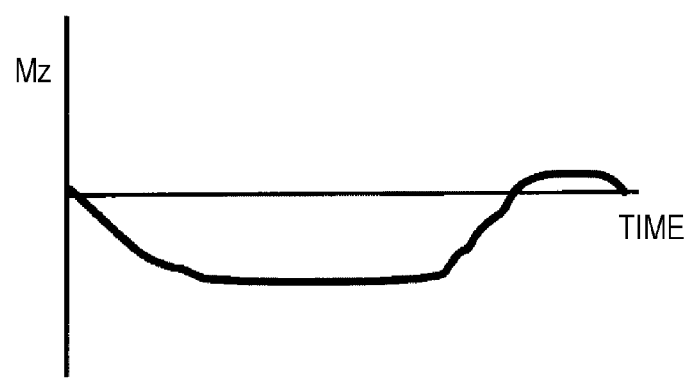
FIG. 9A is a diagram illustrating an example of waveform information of past load data in an Fy direction in a situation in which a user moves straight.
Figure 9B:
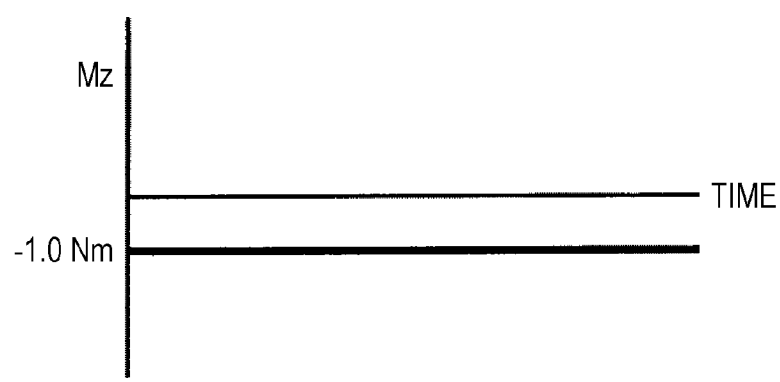
FIG. 9B is a diagram illustrating an average load value of past load data in the Fy direction shown in FIG. 9A.

First, the calculation of the load tendency data is described. FIG. 9A illustrates an example of waveform information of past load data in the Mz direction in a situation in which the user Q moves straight. FIG. 9B illustrates an average load value of past load data in the Mz direction shown in FIG. 9A. As shown in FIG. 9A, the deviation of the center of gravity of the user in the right direction causes the load (the moment) detected by the detector 13 to have a component in the My direction even in the move-straight operation. In this case, although the user's intention is to move straight in the forward direction, the robot 1 has a movement component in the right direction, and thus the user walks while making a fine adjustment of the moving direction to the left. The user's load tendency extractor 23 estimates that the center of gravity of the user is deviated in the right direction when the user walks, and employs the load component in the right direction as load tendency data. The load corrector 18 corrects the deviation of the load in the right direction using the load tendency data. An example of the correction is described below.

The user's load tendency extractor 23 calculates an average of waveform information of the past load data shown in FIG. 9A. As a result, the average load value of the past load data is obtained as load tendency data as shown in FIG. 9B. In the example shown in FIG. 9B, the past average load value is −1.0 Nm in the Mz direction.

Figure 10A:
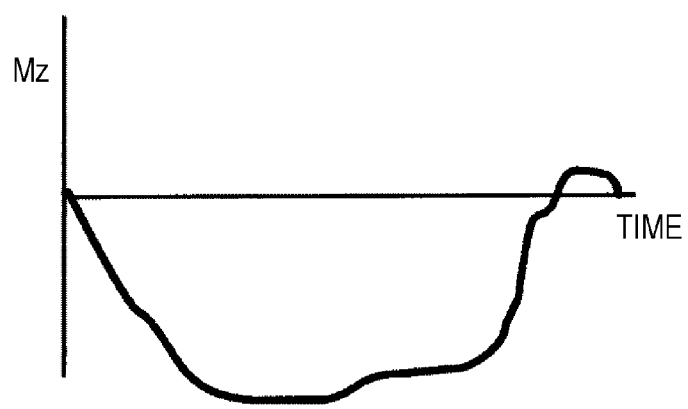
FIG. 10A is a diagram illustrating an example of waveform information of current load data in the Fy direction in a situation in which a user moves straight.
Figure 10B:
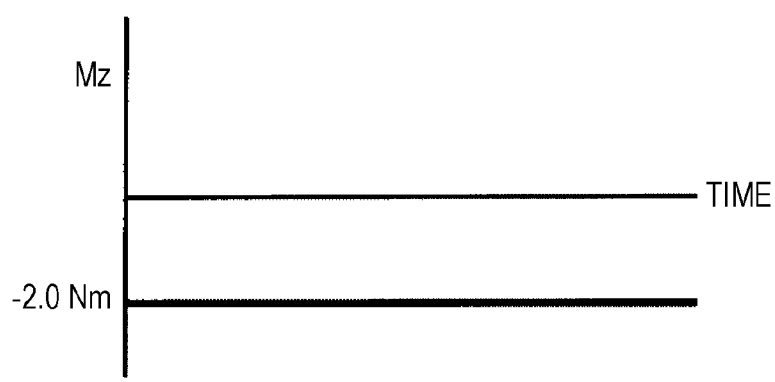
FIG. 10B is a diagram illustrating an average load value of the current load data in the Fy direction shown in FIG. 10A.

Next, an average load value is calculated from the current load data. FIG. 10A illustrates an example of waveform information of the current load data in the Mz direction when the user Q moves straight. FIG. 10B illustrates an average load value of the current load data in the Mz direction shown in FIG. 10A.

The load corrector 18 calculates an average of waveform information of the current load data shown in FIG. 10A. As a result, the average load value of the current load data is obtained as shown in FIG. 10B. In the example shown in FIG. 10B, the current moving average load value is −2.0 Nm in the Mz direction.

The load corrector 18 calculates the correction coefficient by dividing the past average load value by the current moving average load value. In the case of the present example, the correction coefficient is calculated as (−1.0 Nm/−2.0 Nm)=0.5. The load corrector 18 corrects the handle load by multiplying the waveform information of the current load data by the correction coefficient. That is, the value of the handle load in the Mz direction detected by the handle load detector 13 is corrected by multiplying the waveform information of the current load data shown in FIG. 10A by the correction coefficient 0.5.

Figure 11:
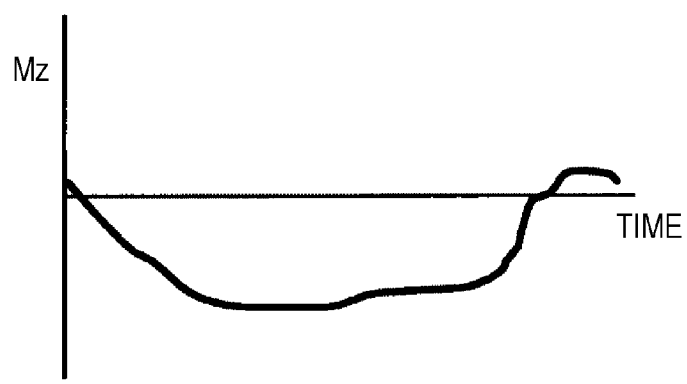
FIG. 11 is a diagram illustrating an example of waveform information of corrected load data.

FIG. 11 illustrates an example of waveform information of corrected load data. The handle load detected by the handle load detector 13 (the waveform information shown in FIG. 10A) is multiplied by the correction coefficient, and, as shown in FIG. 11, the corrected load data is obtained as a result.

The estimator 19 that estimates user's intention of moving estimates the intention of moving of the user Q based on the information on the corrected handle load.

The manner of correcting the handle load is not limited to the example described above. For example, in a case where the robot 1 performs the move-forward operation based on the values handle load in the Fy direction and the Fz direction, the average load value in the Fy direction and the average load value in the Fz direction may be employed as the load tendency data. That is, when the robot 1 performs the move-forward operation, the value of the handle load may be corrected using the average load value in the Fy direction and that in the Fz direction. On the other hand, in a case where the robot 1 performs the turning operation based on the load in the Mz direction (the moment), the average load value in the Mz direction may be used as the load tendency data. That is, when the robot 1 performs the turning operation, the value of the handle load may be corrected using the average load value in the Mz direction. Alternatively, the average load value may be calculated in each of all directions Fx, Fy, Fz, Mx, My, and Mz, the value of the handle load may be corrected using the average load values in all directions. By correcting the handle load using average load values in a plurality of directions as described above, it becomes possible to more accurately recognize the load tendency of the user Q, which makes it possible for the robot 1 to operate in a more proper manner depending on the physical ability of the user Q. In the correction of the handle load, the average load value may be calculated at least in one of directions Fx, Fy, Fz, Mx, My, and Mz depending on the movement control of the robot 1, and the handle load may be corrected using the calculated average load value.

The correction of the handle load may be performed by subtracting, from the current load value, the difference between the current load value and the past load tendency data, or by multiplying the current load value by a coefficient determined depending on the past load tendency data. In a case where the control is performed based on the sum of the Fz value and the Fy value, the ratio of the Fz value and the Fy value in the sum may be changed. For example, the ratio may be changed from Fz:Fy=8:2 to Fz:Fy=6:4. Instead of using only the load tendency data of a user in the correction, a comparison may be performed between the load tendency data of the user and the average load tendency data of a plurality of users other than the present user, and the correction ratio may be changed such that the difference is reduced. The calculation of the average load tendency data of a plurality of users may be performed separately for each of groups classified according to a combination of age, sex, place, walking ability (walking speed, walking rate, step, standing posture, swaying from side to side) and the like.

Constituent elements of the robot 1 for supporting the user Q to walk have been described above. Next, constituent elements of the robot 1 for ensuring safety in supporting the user Q to walk will be described below.

As shown in FIG. 3, the robot 1 further includes, as constituent elements for ensuring safety in supporting the user Q to walk, a projector 51, a moving speed detector 52, a luggage weight detector 53, an obstacle detector 54, and a safety ensuring area setter 55.

As illustrated in FIG. 1, the projector 51 is a unit that projects light onto the walking surface S on which the user Q walks. In the present embodiment, the projector 51 projects a warning image R onto the walking surface S. The warning image R is an image for giving a warning against the robot 1 to a third person located close to the robot 1.

Figure 12:
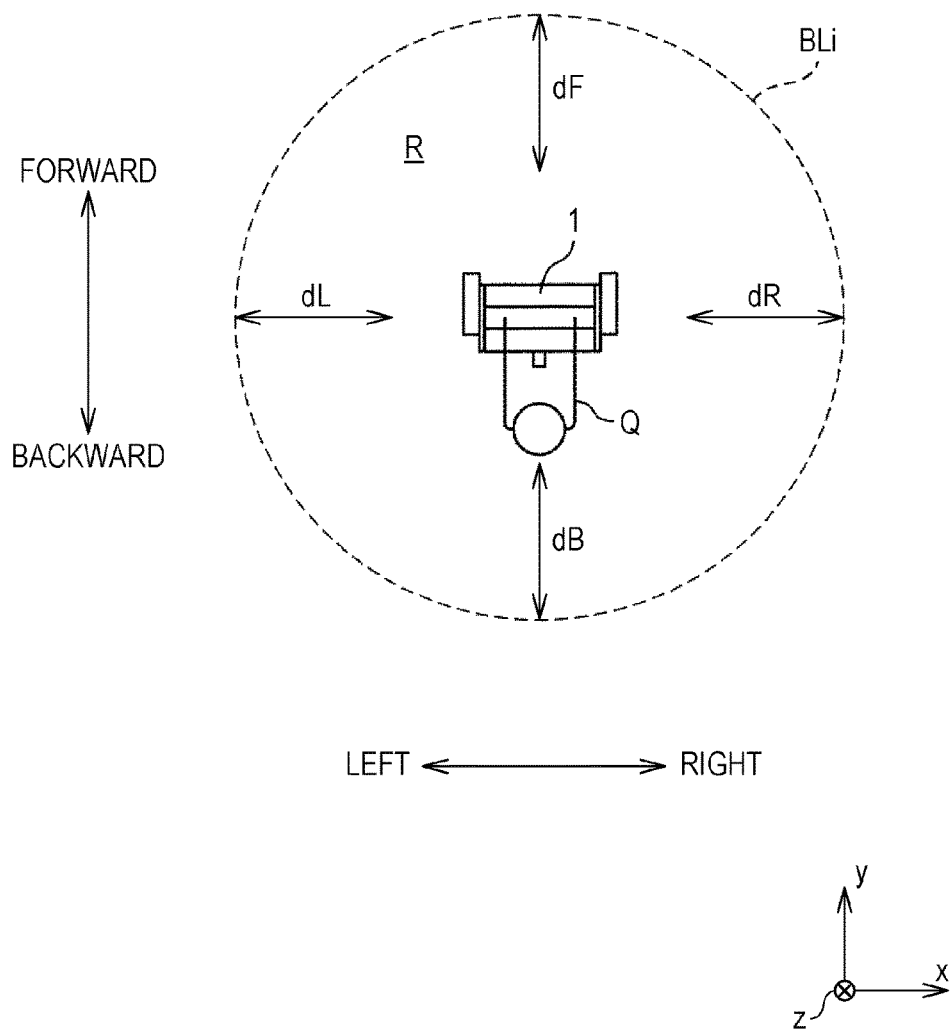
FIG. 12 is a diagram illustrating a safety ensuring area around a walking support robot.

FIG. 12 is a diagram illustrating the robot 1 and the user Q seen from the above. In FIG. 12, the warning image R with a circular shape is shown. The circular shape of the warning image R indicates a safety ensuring area for ensuring safety for not only the user Q but also a third person. More specifically, a boundary line BL (a contour line of the warning image R) is provided a particular distance apart from the robot 1 such that the robot 1 is enclosed at least partially by the boundary line, and the safety ensuring area is defined in an area between the boundary line BL and the robot 1.

Note that the boundary line BLi shown in FIG. 12 is a boundary line provided in an initial state in which the robot 1 is at rest or is moving at a low speed (low compared to a predetermined threshold speed). In this initial state, a distance dF to the robot 1 in the forward direction, a distance dB in the backward direction, a distance dL in the leftward direction, and a distance dR in the rightward direct are all equal, that is, the boundary line BLi has a nearly circular shape.

The contour line of the warning image R projected by the projector 51, that is, the shape of the boundary line BL, is not fixed but changes in various manners depending on the situation. Examples of various shapes of the boundary line BL are described below.

Figure 13:
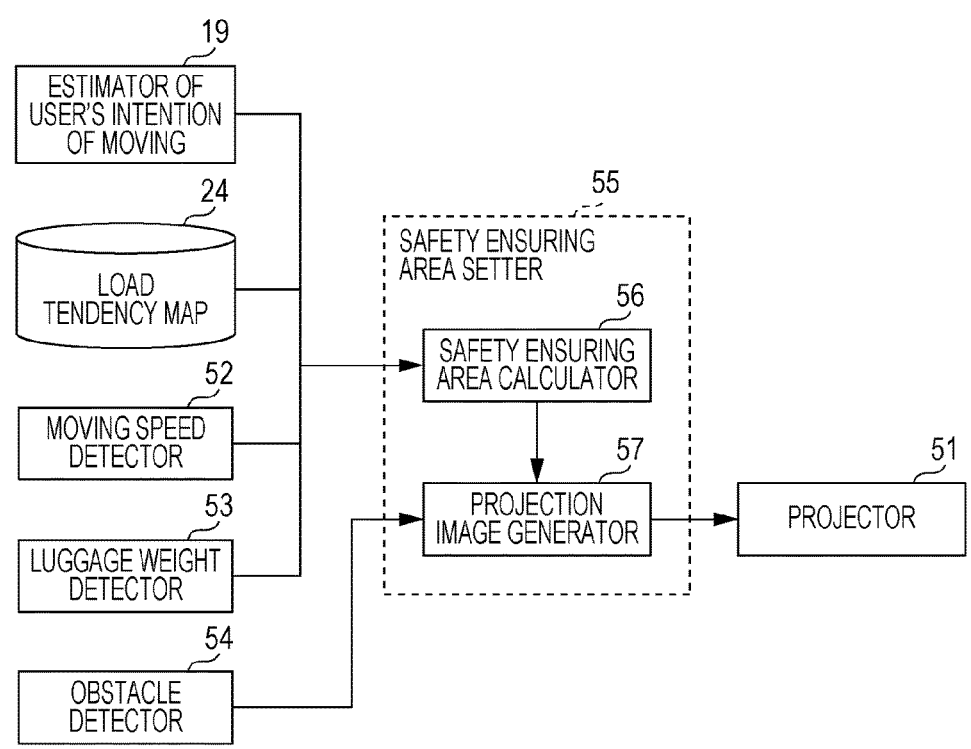
FIG. 13 is a control block diagram illustrating a control configuration to ensure safety associated with a walking support robot according to an embodiment of the present disclosure.

FIG. 13 is a control block diagram illustrating a control configuration to ensure safety, that is, to provide the warning image R.

As shown in FIG. 13, the projector 51 projects the warning image R, that is, the safety ensuring area set by the safety ensuring area setter 55. The safety ensuring area setter 55 includes a safety ensuring area calculator 56 that calculates the safety ensuring area varying in various manners to adapt to the situation, and a projection image generator 57 that generates the warning image R that represents the safety ensuring area calculated by the safety ensuring area calculator 56 and is projected onto the walking surface S by the projector 51.

The safety ensuring area calculator 56 calculates the safety ensuring area adapted to various situations, and more particularly, calculates the distance from the robot 1 to the boundary line BL.

For example, as for the distance from the robot 1 to the boundary line BL, the forward distance dF, the backward distance dB, the leftward distance dL, and the rightward distance dR are calculated as shown in FIG. 12. For example, these distances dF, dB, dL, and dR may be expressed as follows.

$$dF = idF \times \alpha F$$

$$dB = idB \times \alpha B$$

$$dL = idL \times \alpha L$$

$$dR = idR \times \alpha R \quad (1)$$

In formula (1), idF, idB, idL, and idR denote initial distance values, and they are, for example, 50 cm. $\alpha F$, $\alpha B$, $\alpha L$, and $\alpha R$ are variables varying depending on the situation.

The safety ensuring area calculator 56 calculates the distance from the robot 1 to the boundary line BL of the safety ensuring area based on the handle load detected by the handle load detector 13. More specifically, based on the moving direction and the moving speed (the walking direction and the walking speed) of the user Q estimated by the estimator 19 that estimates user's intention of moving, the safety ensuring area calculator 56 calculates the distance from the robot 1 to the boundary line BL, that is, the safety ensuring area calculator 56 determines the variables αF, αB, αL, and αR.

Figure 14:
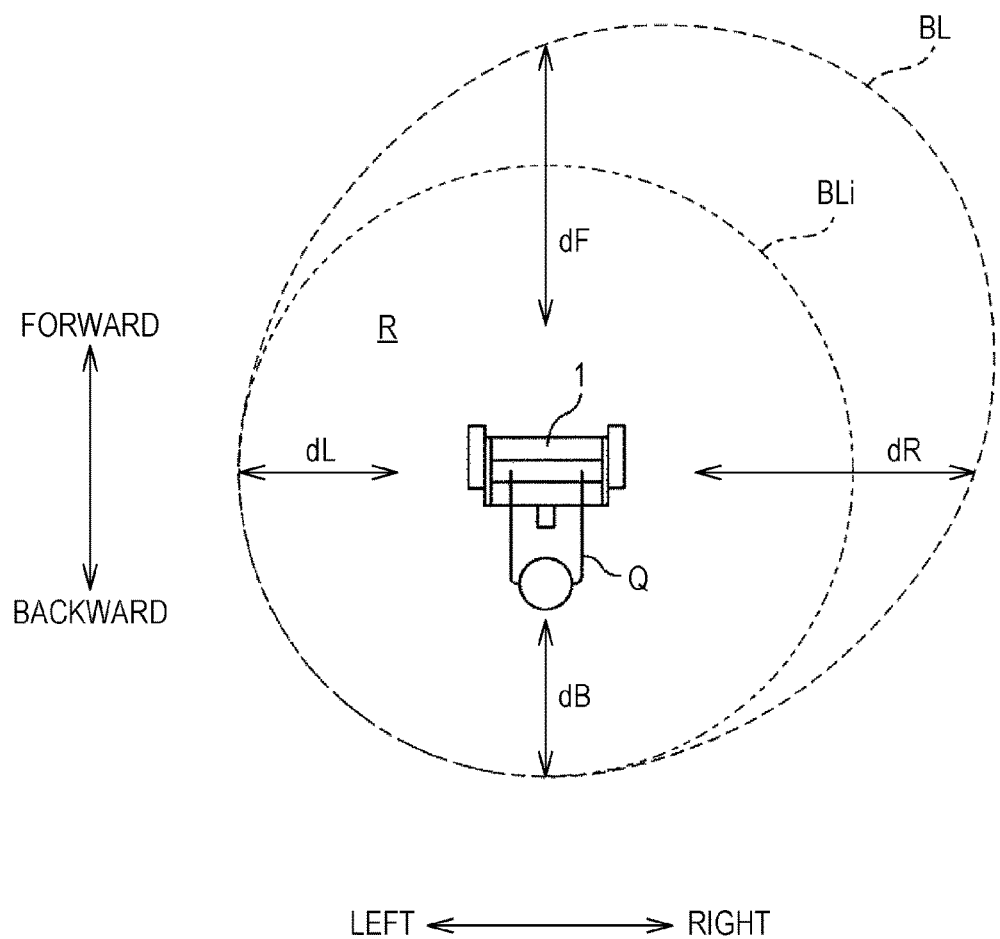
FIG. 14 is a diagram illustrating an example of a change in a boundary line of a safety ensuring area around a walking support robot.

An example is described below for a case where the intention of moving of the user Q is to move in a diagonally forward right direction. In this case, as shown in FIG. 14, the safety ensuring area calculator 56 determines the safety ensuring area such that the forward distance dF and the rightward distance dR are respectively larger than the initial values idF and idR. More specifically, the variables αF and αR are set to values greater than 1 and proportional to the moving speed. As the moving speed intended by the user Q is greater, that is, as the handle load applied to the handle 12 by the user Q is greater, the variables αF and αR are set to values more greatly apart from 1.

Based on the distance between the robot 1 and the boundary line BL determined by the safety ensuring area calculator 56, the projection image generator 57 determines the shape of the boundary line BL and generates the warning image R such that the determined boundary line BL defines the contour of the warning image R. Because the intention of moving of the user Q is to move in the diagonally forward right direction in the present example, the warning image R is generated such that its contour is given by the boundary line BL with a shape changed so as to be expanded more greatly in the diagonally forward right direction than in the other directions from the circular-shaped boundary line BLi in the initial state, that is, such that the warning image R has a nearly elliptical shape whose major axis extends in the diagonally forward right direction.

The warning image R generated by the projection image generator 57 based on the intention of moving of the user Q is projected by the projector 51 onto the walking surface S. Thus, the safety ensuring area around the robot 1 is presented not only to the user Q but also a third person close to the robot 1.

Thus, when a third person close to the robot 1 visually sees the warning image R (that is, the safety ensuring area) projected onto the walking surface S (in particular when this third person is in the diagonal forward right direction), the third person moves such that the third person does not tread the warning image R (that is, the third person moves out from the safety ensuring area). This makes it possible to prevent the robot 1 (or the user Q) from colliding with the third person when the moving direction of the robot 1 is changed to the diagonal forward right direction.

Furthermore, as shown in FIG. 13, the safety ensuring area calculator 56 calculates the distance from the robot 1 to the boundary line BL of the safety ensuring area based on the load tendency data stored in the load tendency map 24 such as that shown as an example in FIG. 6. An example of the calculation is described below for a case where the user tends to continuously tilt his/her body to the left of the robot 1 when the user Q walks in the forward direction (along the y-axis). More specifically, it is assumed by way of example that the load tendency map 24 includes data indicating a moment of 1.0 Nm as a load in a particular direction different from the moving direction.

In the case where the user Q tends to keep his/her posture tilted to the left of the robot 1 when the user Q moves, the safety ensuring area calculator 56 determines the safety ensuring area such that the leftward distance dL from the robot 1 and the boundary line BL is greater than the initial value idL as shown in FIG. 15. That is, the variable αL in formula (1) is set to a value greater than 1 and proportional to the moment Mz=1.0 Nm stored in the load tendency map 24.

Based on the distance between the robot 1 and the boundary line BL determined by the safety ensuring area calculator 56, the projection image generator 57 generates the warning image R such that its contour is given by the boundary line BL with a shape changed so as to be expanded more greatly in the leftward direction than in the other directions from the circular-shaped boundary line BLi in the initial state.

The warning image R generated by the projection image generator 57 based on the load tendency of the user Q (that is, the tendency of the handle load) is projected by the projector 51 onto the walking surface S.

Thus, when a third person close to the robot 1 visually sees the warning image R (that is, the safety ensuring area) projected onto the walking surface S (in particular when this third person is in the leftward direction from the robot 1), the third person moves such that the third person does not tread the warning image R (that is, the third person moves out from the safety ensuring area). Thus, when the user Q keeps his/her posture tilted to the left of the robot 1, even if the user Q loses his/her balance and suddenly turns the handle 12 to the left without intention, the third person can prevent himself/herself from coming into contact with the robot 1.

Furthermore, as shown in FIG. 13, based on the moving speed of the robot 1 detected by the moving speed detector 52, the safety ensuring area calculator 56 determines the distance from the robot 1 to the boundary line BL of the safety ensuring area. As the moving speed of the robot 1 is higher, the third person will receive a greater shock when the third person comes into contact with the robot 1. Therefore, it is necessary to set the safety ensuring area taking into account the moving speed of the robot 1.

The moving speed detector 52 is, for example, an encoder configured to detect the rotation speed of the rotary element 16 thereby detecting the actual moving speed of the robot 1.

An example is described below for a case where the robot 1 moves straight in the forward direction at a high speed (greater than a predetermined threshold speed).

When the robot 1 moves at a high speed (when the moving speed detector 52 detects a high speed), the safety ensuring area calculator 56 determines the safety ensuring area such that the forward distance dF between the robot 1 and the boundary line BL is greater than the initial value idF as shown in FIG. 16. More specifically, the variable αF in formula (1) is set to a value greater than 1 and proportional to the moving speed of the robot 1 detected by the moving speed detector 52. More specifically, the variable αF is set such that as the moving speed of the robot 1 detected by the moving speed detector 52 is higher, the variable αF is more greatly apart from 1.

Based on the distance between the robot 1 and the boundary line BL determined by the safety ensuring area calculator 56, the projection image generator 57 generates the warning image R such that its contour is given by the boundary line BL with a shape changed so as to be expanded more greatly in the forward direction than in the other directions from the circular-shaped boundary line BLi in the initial state.

The warning image R generated by the projection image generator 57 based on the moving speed of the robot 1 is projected by the projector 51 onto the walking surface S.

Thus, when a third person close to the robot 1 visually sees the warning image R (that is, the safety ensuring area) projected onto the walking surface S (in particular when this third person is in the forward direction), the third person moves such that the third person does not tread the warning image R (that is, the third person moves out from the safety ensuring area). This makes it possible to prevent the robot 1 moving at a high speed from colliding with the third person.

Furthermore, as shown in FIG. 13, the safety ensuring area calculator 56 calculates the distance from the robot 1 to the boundary line BL of the safety ensuring area based on a luggage weight detected by the luggage weight detector 53.

In the present embodiment, as illustrated in FIG. 1, the robot 1 includes a luggage space 58 where a luggage is allowed to be put. The luggage space 58 is, for example, a tray, a basket, or the like. As the weight of the luggage put in the luggage space 58 is greater, the shock to a third person is greater when the robot 1 comes into contact with the third person, and the braking distance is greater. Therefore, it is necessary to set the safety ensuring area taking into account the luggage weight. In the example shown in FIG. 1, the luggage space 58 has a size allowed to be provided in the main part 11. However, the luggage space 58 is not limited to such a configuration. For example, the main part 11 itself may be a large cart such as a shopping cart, and the main part 11 itself may function as the luggage space 58.

The luggage weight detector 53 estimates the weight of the luggage put in the luggage space 58 based on the handle load detected by the handle load detector 13 and the moving speed of the robot 1 (that is, the rotation speed of the rotary element 16) detected by the moving speed detector 52.

Note that the moving speed of the robot 1 may change depending on whether there is a luggage or not even when the handle load applied to the handle 12 by the user Q is equal. That is, when there is a luggage put on the robot 1, as the weight of the luggage is greater, the moving speed of the robot 1 becomes lower compared with the case where there is no luggage. Therefore, by comparing the moving speed in the state where there is a luggage and the moving speed in the state in which there is no luggage, it is possible to estimate the weight of the luggage put on the robot 1.

Instead of estimating the luggage weight based on the moving speed of the robot 1, the luggage weight detector 53 may directly measure the luggage weight using, for example, a weight sensor.

When there is a luggage put on the robot 1 (when a luggage weight is detected by the luggage weight detector 53), the safety ensuring area calculator 56 determines the safety ensuring area such that the forward distance dF, the backward distance dB, the leftward distance dL, and the rightward distance dR between the robot 1 and the boundary line BL are respectively greater than the initial values idF, idB, idL, and idR as shown in FIG. 17. More specifically, the variables $\alpha$F, $\alpha$B, $\alpha$L, and $\alpha$R in formula (1) are set to values greater than 1 and proportional to the luggage weight detected by the luggage weight detector 53. That is, these variables $\alpha$F, $\alpha$B, $\alpha$L, and $\alpha$R are set such that as the luggage weight detected by the luggage weight detector 53 is greater, the variables are more greatly apart from 1.

Based on the distance between the robot 1 and the boundary line BL determined by the safety ensuring area calculator 56, the projection image generator 57 generates the warning image R such that its contour is given by the boundary line BL expanded in the forward direction from the circular-shaped boundary line BLi in the initial state.

The warning image R generated by the projection image generator 57 based on the luggage weight put on the robot 1 is projected by the projector 51 onto the walking surface S.

Thus, when a third person close to the robot 1 visually sees the warning image R (that is, the safety ensuring area) projected onto the walking surface S, the third person moves such that the third person does not tread the warning image R (that is, the third person moves out from the safety ensuring area). This makes it possible to prevent the robot 1 with the increased weight from coming into contact with the third person.

The description has been given above as to one of functions of the safety ensuring area setter 55, that is, the function of giving a warning against the robot 1 or the user Q to a third person close to the robot 1. In addition to this function of giving a warning to a third person, the safety ensuring area setter 55 according to the present embodiment also has a function of giving a warning to the user Q of the robot 1.

Figure 18:
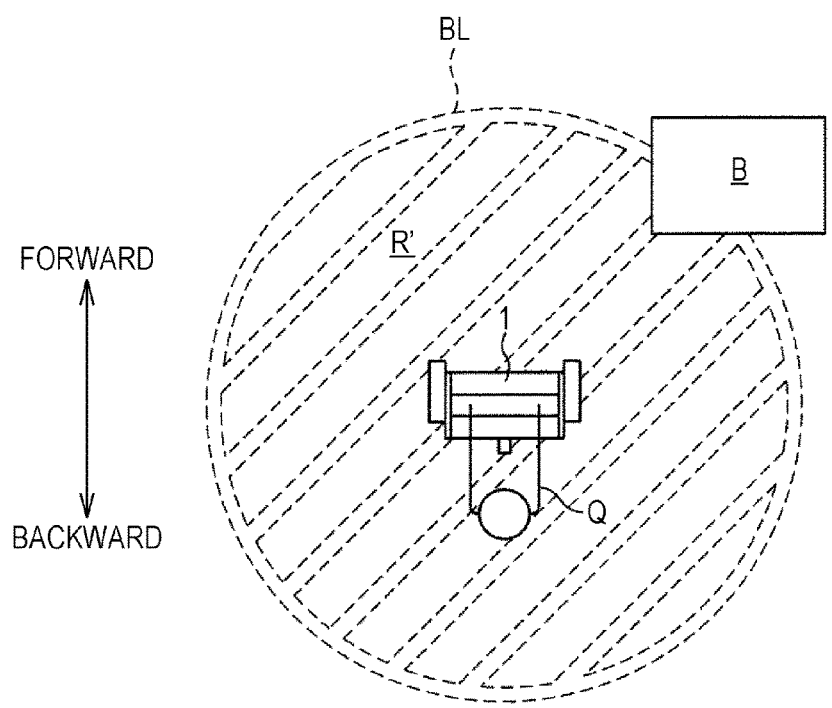
FIG. 18 is a diagram illustrating a walking support robot in a state in which the walking support robot gives a warning against an obstacle to a user.

More specifically, as shown in FIG. 18, in a case where there is an obstacle (which may be a third person) B which may come into contact with the robot 1 or the user Q, the user Q is notified of the fact that the obstacle B has been detected thereby giving a warning against the obstacle B to the user Q. For this purpose, the robot 1 includes an obstacle detector 54 as shown in FIG. 1.

The obstacle detector 54 is, for example, an ultrasonic sensor configured to detect an obstacle B which has come into the safety ensuring area. For example, when an obstacle B has come into an area between the robot 1 and the initial boundary line BLi shown in FIG. 12, the obstacle B is detected.

As illustrated in FIG. 13, when the obstacle detector 54 detects an obstacle B, the projection image generator 57 of the safety ensuring area setter 55 generates a warning image R' for giving a warning against the obstacle B to the user Q.

As shown in FIG. 18, the warning image R', for giving the warning against the obstacle B to the user Q, generated by the projection image generator 57 is projected by the projector 51 onto the walking surface S. The warning image R' may be, for example, an image of stripes filled with black and yellow colors in the safety ensuring area defined by the boundary line BL.

This makes it possible for the user Q, who walks while being supported by the robot 1, to recognize the existence of an obstacle B that can come into contact with the robot 1, thereby allowing the user Q to act to avoid the obstacle B. Thus, it is possible to avoid a collision between the robot 1 and the obstacle B.

When an obstacle B is detected by the obstacle detector 54, a voice/sound warning may be issued instead of or in addition to giving a warning against to the obstacle B to the user Q using the warning image R'. For this purpose, the robot 1 may include a speaker (not illustrated) for outputting a voice/sound.

According to the embodiment described above, it is possible to reduce the possibility that a third person comes into contact with the walking support robot or a user thereof when the user is walking while being supported by the walking support robot.

The present disclosure has been described above with reference to embodiments. However, the present disclosure is not limited to those embodiments.

For example, in the embodiments described above, the warning image R projected by the projector 51 onto the walking surface has such a shape that the contour is defined by the boundary line BL of the safety ensuring area as shown in FIG. 12. Alternatively, as shown in FIG. 19, the projector 51 may project a warning image R with a shape of a ring onto the walking surface S such that the robot 1 is enclosed by the ring. In this case, the whole of the ring-shaped warning image R indicates the boundary line of the safety ensuring area.

Figure 20:
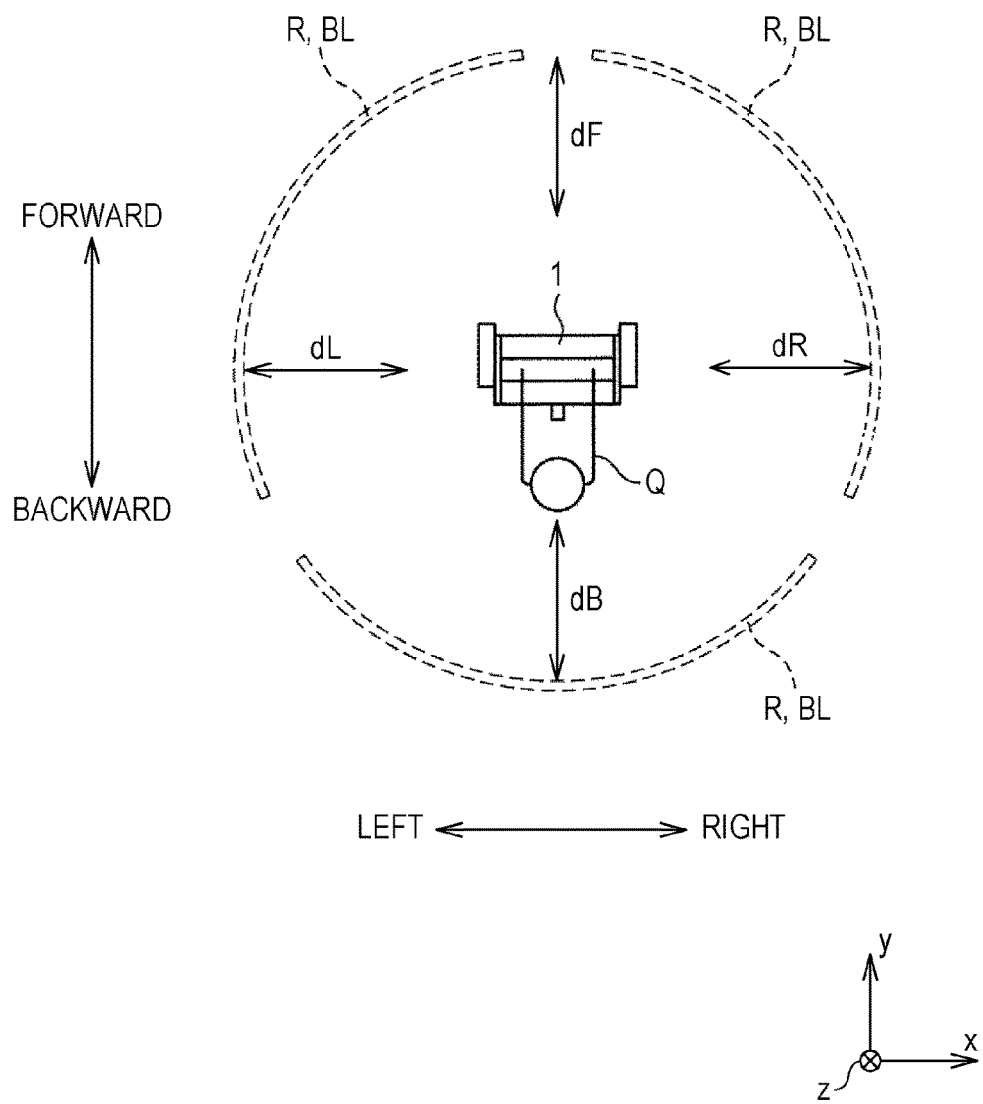
FIG. 20 is a diagram illustrating still another example of a boundary line of a safety ensuring area around a walking support robot.

In the embodiments described above, as shown in FIG. 12, the boundary line BL of the safety ensuring area is continuous. That is, the boundary line BL fully encloses the robot 1. Alternatively, the boundary line BL of the safety ensuring area may be discontinuous as shown in FIG. 20. That is, the boundary line BL of the safety ensuring area may be configured so as to at least partially enclose the robot 1. For example, the boundary line BL may be a contour line of a semicircle provided so as to surround a font part of the robot 1.

The boundary lines (warning images) or the warning images shown in FIG. 12 and FIG. 14 to FIG. 20 are not limited to still images, but a moving image varying regardless of the handle load may be employed. For example, the boundary line may blink periodically at particular intervals. For example, the boundary line may change in color or shape periodically at particular intervals. This makes it possible to give a stronger warning against to the robot 1 to a third person close to the robot 1.

The projector that projects the boundary line onto the walking surface is not limited to the type employed in the embodiments described above. For example, the projector may be a light emitter such as an LED that illuminates the walking surface with light. That is, the projector may be configured to project light (an image) onto the walking surface such that the light changes depending on the handle load detected by the handle load detector. For example, the optical axis of the projector may be tilted to change the projected position of the light (the image) thereby changing the light (the image) on the walking surface. Alternatively, for example, a plurality of projectors may be selectively blinked to change the light (the image) on the walking surface. Alternatively, the luminance, the blinking period, and the color may be changed to change the light (the image) on the walking surface. Alternatively, instead of projecting light (an image) directly onto the walking surface from the projector, the projector may include an optical element such as a mirror, a filter, or the like that projects light (an image) indirectly onto the walking surface so as to change the light on the walking surface.

In addition to or instead of the projector, display apparatuses such as LEDs may be provided at four or eight different positions of the main part of the robot, and the display apparatuses may display (may emit light) in different manners depending on the handle load detected by the handle load detector. For example, the display apparatuses may change the light intensity such that even a third person located far from the robot can recognize the light or may emit light in color different from the color in the environment around the robot thereby achieving highlighting.

In a case where the robot moves autonomously according to a planned root, the projector may project a boundary line expanding in a direction in which the robot moves autonomously, or the display apparatus may provide a display highlighted in the direction in which the robot moves autonomously. The projection range of the projector may be changed based on the handle load applied by the user to the handle of the robot, and the color of the light of the projector may be changed depending on the mode of the autonomous movement of the robot. Alternatively, the projection range of the projector may be changed based on both the handle load and the mode of the autonomous movement. Similarly, the display apparatus such as an LED provided on the main part of the robot may present a display to a third person such that color is different between the user's operation direction of the handle (the direction in which the user intends to move) and the direction in which the robot moves autonomously.

This makes it possible to give a warning to a third person for both cases: a case where the robot moves autonomously; and a case where a user wants to move in a direction different from the direction in which the robot moves autonomously.

In the embodiments described above, the walking support robot moves based on the operation of the handle performed by the user, that is, the walking support robot has the actuator that rotates the rotary element. However, the configuration of the walking support robot is not limited to this example. For example, the walking support robot may not include a driving source such as an actuator that rotates the rotary element, and the walking support robot may be configured to move over the walking surface when a user pushes the handle.

The present disclosure has been described above by way of example with reference to embodiments. To this end, accompanying drawings and detailed descriptions have been provided. Note that constituent elements shown in the accompanying drawings or described in the detailed descriptions may include not only a constituent element that is needed to practice the present disclosure but a constituent element that is not necessarily needed and is provided only for illustration. That is, it should be understood that showing a constituent element in an accompanying drawing or a detailed description does not necessarily mean that this constituent element is indispensable.

The embodiments described above are provided only for illustrating by way of example the present disclosure, and various changes, replacements, additions, removals, or the like are possible without departing from scope of the present disclosure or equivalent scope.

For example, in the walking support robot 1 shown in FIG. 3, FIG. 5, or FIG. 13, the load tendency data generator 15, the load corrector 18, the estimator 19 that estimates user's intention of moving, the actuator controller 21, the user's load tendency extractor 23, the load tendency map 24, the safety ensuring area calculator 56, and the projection image generator 57 may be implemented in various manners. For example, these constituent elements may be realized by a CPU, a storage device such as a memory, a program that is stored in the storage device and that controls the CPU, and data stored in the storage device and used in the program.

The present disclosure is applicable to a walking support robot and a method for supporting a user to walk in a stable manner.

What is claimed is:

1. A robot comprising:
   a rotary element configured to roll over a walking surface on which a user walks;
   a handle held by the user;
   a handle load detector that detects a handle load applied to the handle by the user; and
   a projector that projects light onto the walking surface, the projector being operable to change the light based on the detected handle load, wherein the projector projects a boundary line onto the walking surface such that the robot is enclosed at least partially by the boundary line, and the projector changes a distance between the boundary line and the robot based on the detected handle load.

2. The robot according to claim 1, wherein the projector increases the distance between the boundary line and the robot as the detected handle load increases.

3. The robot according to claim 1, wherein
   the handle load detector detects a handle load in a horizontal direction, and the projector may change a shape of the boundary line such that a first distance between a first part of the boundary line and the robot is greater than a second distance between a second part of the boundary line and the robot as the detected handle load in the horizontal direction increases, the first part of the boundary line being a part of the boundary line located in a direction of the detected handle load, the second part of the boundary line being a part of the boundary line different from the first part.

4. The robot according to claim 1, wherein the projector changes the distance between the boundary line and the robot based on a tendency of the detected handle load.

5. The robot according to claim 4, wherein in a case where the tendency of the handle load detected by the handle load detector indicates a continuous presence of a load in a particular direction different from the moving direction, the projector projects the boundary line such that the distance between the boundary line and the robot in the particular direction is maintained to be greater than in the other directions.

6. The robot according to claim 1, further comprising a luggage space where a luggage is allowed to be put, and a luggage weight detector that detects a weight of the luggage, wherein the projector increases the distance between the boundary line and the robot as the detected weight of the luggage increases.

7. The robot according to claim 1, further comprising a moving speed detector that detects a moving speed of the robot, wherein the projector increases the distance between the boundary line and the robot as the detected moving speed increases.

8. The robot according to claim 1, further comprising an obstacle detector that detects whether an obstacle exists in an area between the boundary line and the robot, and a notifier that, in a case where the obstacle detector detects the obstacle, notifies the user of the existence of the obstacle.

9. The robot according to claim 8, wherein in a case where the obstacle detector detects the obstacle, the projector may project a warning image onto the walking surface to provide a warning against the obstacle.

10. A method of supporting a user to walk using a robot, the method comprising:
  detecting a handle load applied to a handle of the robot by the user;
  projecting light, by a projector disposed on the robot, onto a walking surface on which the user walks; and
  changing the light based on the detected load applied to the handle, wherein the projecting comprises:
    projecting a boundary line onto the walking surface such that the robot is enclosed at least partially by the boundary line; and
    changing a distance between the boundary line and the robot based on the detected handle load.

* * * * *